Sept. 6, 1938.　　　　F. C. BEST　　　　2,129,115
VEHICLE WHEEL
Filed March 23, 1934　　2 Sheets-Sheet 1

Inventor
Frank C. Best
By Watson, Cait, Morse and
Grindle
Attorney

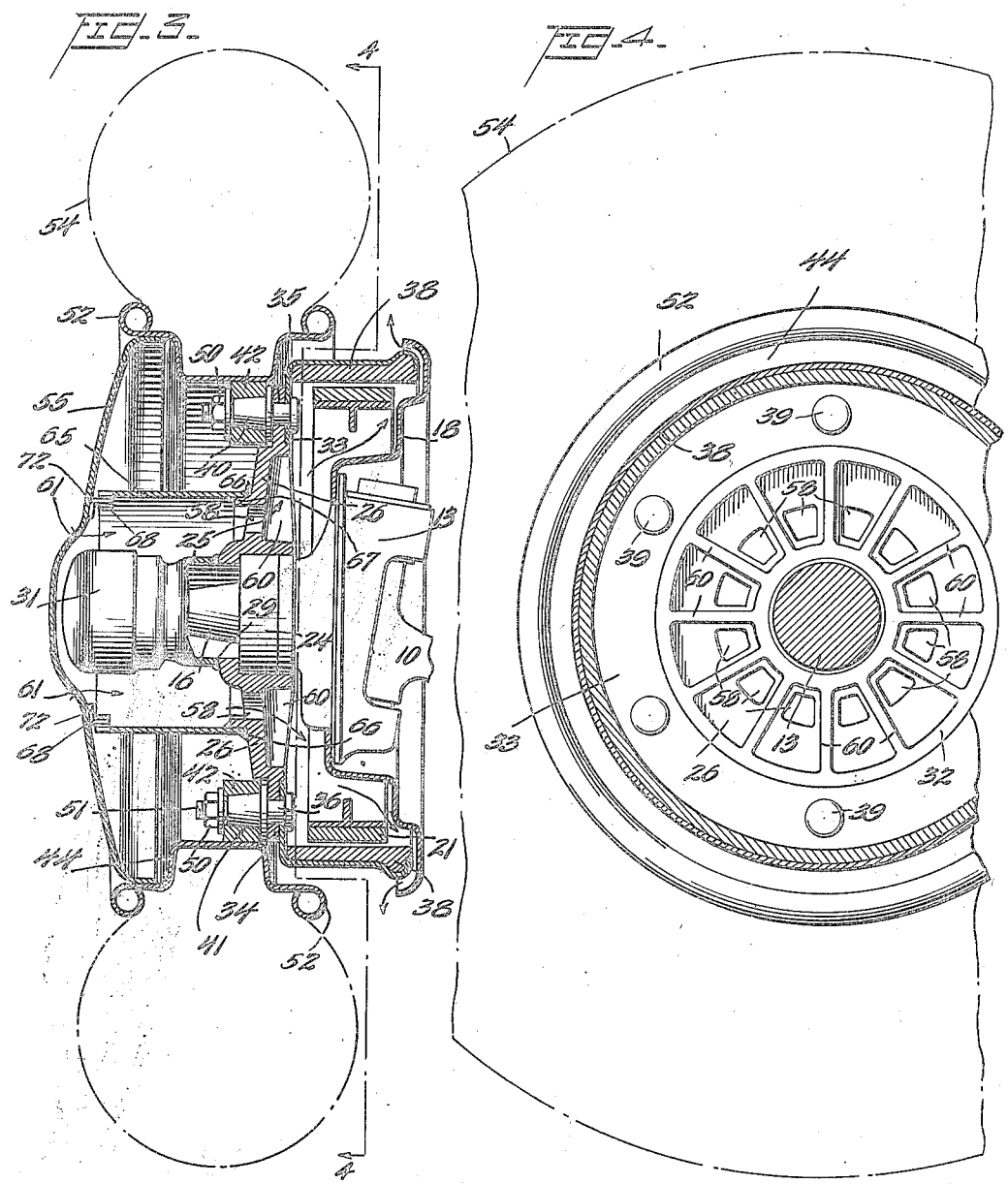

Patented Sept. 6, 1938

2,129,115

UNITED STATES PATENT OFFICE 2,129,115

VEHICLE WHEEL

Frank C. Best, Detroit, Mich., assignor to Packard Motor Car Company, Detroit, Mich., a corporation of Michigan Application March 23, 1934, Serial No. 717,108

5 Claims. (Cl. 301—6)

This invention relates to motor vehicle wheels and has for its object the provision of a simple and inexpensive wheel construction, and more particularly, a wheel construction in which the diameter of the wheel rim supporting the tire may be reduced to a minimum.

The present trend of wheel design is toward low pressure tires of small inner or rim diameter, it being found that such tires improve the riding characteristics of the vehicle and aid substantially in ensuring a high rate of acceleration and deceleration. In accordance with the present invention the rim diameter is reduced to a minimum, the preferred form of the invention contemplating direct attachment of the rim to a radial flange on the wheel hub. By means of this construction the mass of the wheel is greatly reduced and is brought closer to the wheel axis, thereby reducing materially the gyroscopic effect which is particularly undesirable in the steerable road wheels. In practice the reduction in diameter of the wheel proper and consequent elimination of a considerable portion of the heat dissipating surface presented by the wheel structure may offer difficulty. It is a feature of the present invention that the wheel structure is so designed as to reduce the rim diameter to a desirable minimum and at the same time to provide against overheating and consequent deterioration of the tire.

In one form of the invention disclosed herein, the heat developed in the wheel structure, for instance by reason of the intimate association of the vehicle brake therewith, is insulated from the tire, so that overheating of the latter and resultant deterioration of the rubber or sticking of the tire to the rim are avoided. In a further embodiment of the invention, means are provided for preventing excessive temperature rise in the wheel structure by causing circulation of air through the wheel structure and/or the brake mechanism associated therewith.

It is a further object of the invention to provide a unitary wheel hub to which the usual wheel rim may be attached, this hub being constructed so as to simplify the operations required to produce the same.

Further objects and features of the invention will be apparent from the following description taken in connection with the accompanying drawings, in which Figure 1 is a transverse sectional view of a wheel structure and associated supporting means therefor illustrating one embodiment of the invention;

Figure 3 is a sectional view corresponding to Figure 1 and illustrating a further modification of the invention;

Figure 4 is a vertical section taken substantially on the line 4—4 of Figure 3; and Figure 5 is a fragmentary perspective view of a detail shown in Figure 3.

Figures 1, 2:
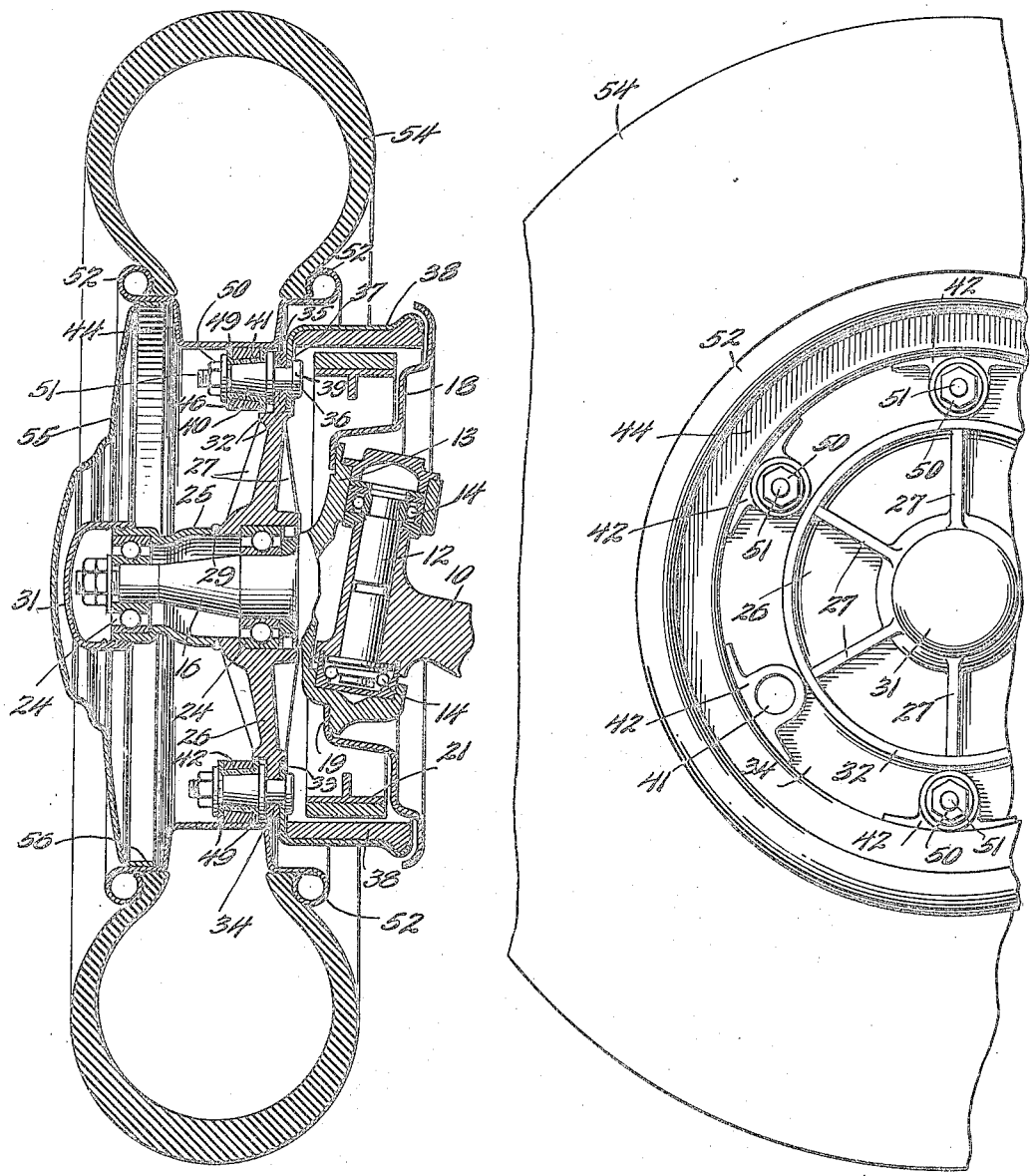
Figure 2 is a front elevation of the construction shown in Figure 1 with the cover plate removed.

In describing the invention reference will be made to the embodiments of the invention selected for the purpose of illustration and specific language will be used to describe the several elements thereof. It will nevertheless be understood that no limitation of the invention is thereby intended but that various additional modifications and alterations of the structure are contemplated.

Referring now to Figures 1 and 2, it will be observed that the wheel structure is shown for convenience as associated with a conventional front wheel axle construction, including the axle 10, the king pin 12, and the steering knuckle 13, the latter being supported for swinging steering movement by bearings 14 on the king pin and being formed integrally with a wheel spindle 16. An annular brake backing plate 18 secured to the steering knuckle 13 as at 19 serves to partially house the usual expanding brake element 21, the latter being positioned for engagement with a brake drum 22 carried by the wheel structure in a manner hereinafter more fully described.

The construction thus far mentioned is wholly conventional and forms no essential part of the present invention. Thus it is obvious that the front axle and associated elements might be replaced by a rear driving axle, the choice of a front axle for illustration of the invention being without significance.

The wheel spindle 16 is provided with the usual bearings 24 on which the wheel hub is journalled. In the preferred form of the invention this wheel hub comprises an axially directed tubular portion 25 which may be formed of sheet metal, and a radially disposed annular flange portion 26 of forged metal, the portion 26 of the hub being provided with a plurality of reinforcing radially disposed ribs 27. The two portions of the hub are welded together as at 29 to provide a unitary structure, the formation of the hub in this manner simplifying to a considerable extent the machining operations required and thus reducing the cost of production materially. The tubular portion 25 of the hub is threaded at its outer end to receive the usual hub cap 31.

Adjacent the periphery of the flange portion 26 of the hub the latter is provided with annular ribs on either side as indicated at 32 defining a circumferential peripheral portion 34 having flat faces on the opposite sides thereof. The peripheral portion 34 of the hub member is apertured as at 35 at a plurality of circumferentially spaced points to receive rim retaining bolts 36 which extend through corresponding apertures 37 in an inwardly directed flange portion 33 of a brake drum 38, the bolts 36 being headed over as at 39 to retain the brake drum in fixed position on the hub.

The outer ends of the bolts 36 are tapered as shown at 40 to extend through correspondingly tapered apertures 41 in lugs 42 which are rigidly secured to the inner face of the wheel rim 44 in any convenient manner, for instance by welding. A heat insulating bushing 46, formed for instance of asbestos or the like, surrounds the tapered portion 40 of each bolt 36 and completely isolates the bolt from the associated rim lug 42. The bushing 46 is preferably formed as shown in Figure 1 of the drawings with annular flange portions 49 at each end thereof, the latter engaging the adjacent radial faces of the lugs 42 so that the bushings are normally retained with the lugs. Thus in assembling the rim 44 on the hub, the lugs 42 with the assembled bushings 46 are placed on the tapered portions 40 of the bolts 36 and are retained in position thereon by the usual nuts 50 engaging reduced threaded portions 51 formed on the bolts. The rim 44 may be provided with beaded portions 52 receiving a balloon tire 54 in the usual manner and the construction is completed by a cover plate 55 in the form of a disk having an axially directed annular flange portion 56 fitting snugly within the rim and readily removable from the latter for the purpose of changing the rim and tire. It will be observed that the rim 44 is so positioned as to surround the wheel spindle 16 adjacent the central portion of the latter to eliminate undue strain on the bearings 24 and associated parts.

Although the rim diameter is reduced by means of this construction to a minimum and is therefore disposed closely adjacent the brake drum 38, the heat insulating bushing 46 will function to prevent the transmission to the wheel rim and thence to the tire of the heat developed on the application of the brakes, despite the fact that a considerable portion of heat radiating surface present in the conventional wheel construction has been eliminated.

In the form of the invention shown in Figures 3 and 4 of the drawings the construction is for the most part similar and similar reference characters have been used to designate corresponding elements. In this arrangement the wheel rim lugs 42 directly engage the tapered portions 40 of the bolts 36, the bushings 46 being dispensed with, and means are provided to cause circulation of air through the wheel structure to carry away excess heat. Thus the flange portion 26 of the wheel hub may be provided with a plurality of circumferentially spaced apertures 58, and a plurality of inwardly directed flanges 60, preferably formed integrally with the flange 26 and extending generally radially, serve to draw air through the apertures 58 as the wheel is rotated, apertures 61 being provided in the cover plate 55 to permit the passage of air therethrough. The flanges 60 may be given any suitable shape or direction to enable them to function as air propulsion vanes, the air discharged by these flanges passing in the direction of the arrows shown in the drawings through the brake structure to cool the latter. In this manner a considerable quantity of heat is dissipated both from the flange portion 26 of the hub and directly from the brake drum 38 and the brake element 31, so that excessive rise in temperature of the wheel structure as a whole is prevented.

In order that smooth and uninterrupted flow of air may be established between the apertures 61 in the cover plate 55 and the apertures 58 in the flange 26, means affording with the hub 25 and associated parts an annular air passage between the cover plate and the flange is preferably provided. This means may consist of a substantially cylindrical member 65, preferably of sheet metal, which may be secured to the flange 26 by welding as indicated at 66, an annular projection 67 being formed on the flange 26 to strengthen the construction. The member 65 extends to a point adjacent the cover plate and may therefore be utilized to maintain the latter in position within the rim 44 against unintentional displacement.

Thus lugs 68 may be struck inwardly from the member 65 at circumferentially spaced points, these lugs having projections 69 thereon adapted to seat in openings 71 in corresponding lugs 72 secured to the cover plate by welding or otherwise. The lugs 68 are sufficiently flexible to permit proper engagement thereof with the lugs 72, either when the cover plate is first properly located and thrust directly inward, or when the cover plate is rotated in a counterclockwise direction to pass the lugs 72 over the ends of the lugs 68. Alternatively, the member 65 may be secured to the cover plate and arranged for detachable engagement with the flange 26 in a manner similar to that just described.

With this construction the flow of air is confined to an axial, substantially annular path, and the efficiency of the air propulsion vanes thereby materially increased.

While the circulation of the air established by the arrangement shown in Figures 3 and 4 is normally sufficient to maintain a relatively low temperature, it is of course possible to use in addition heat insulating means to prevent transmission of heat between the wheel structure and the rim as described in connection with the arrangement shown in Figures 1 and 2, and a combination of these two modifications is contemplated by the present invention. It is further obvious that the circulation of air through the wheel structure may be effected in a direction opposite to that shown in the drawings by slight alteration of the construction. Various other changes are contemplated such as would occur to one skilled in the art to which the invention relates.

Having thus described the invention, what is claimed as new and desired to be secured by Letters Patent is:

1. A vehicle wheel assembly comprising a hub having an apertured radial flange, a rim secured to said flange, a brake drum secured to said flange, means for forcing air through the apertures in said flange and about said brake drum, said means comprising vanes formed on said flange, and a disk shaped cover plate detachably engaging said rim, said cover plate being apertured to permit passage of air therethrough.

2. A vehicle wheel assembly comprising a hub having an apertured radial flange, a rim of relatively small diameter secured to said flange, means for forcing air through the apertures in said flange, a cover plate engaging said rim, said cover plate being apertured to permit passage of air therethrough, and means extending between said flange and cover plate and forming with said hub a direct annular passage for air between the apertures in the cover plate and the apertures in the flange.

3. A vehicle wheel assembly comprising a hub having an apertured radial flange, a rim of relatively small diameter secured to said flange, means for forcing air through the apertures in said flange, a cover plate engaging said rim, said cover plate being apertured to permit passage of air therethrough, means extending between said flange and cover plate and forming with said hub a direct annular passage for air between the apertures in the cover plate and the apertures in the flange, and operative connections between said last named means and said flange and cover plate respectively for retaining the latter in position in engagement with said rim.

4. A vehicle wheel comprising a hub, having an apertured annular flange, a rim secured to said flange, a brake drum carried by said hub, means including axial flow fan blades supported for rotation with said wheel and positioned and directed to cause a current of air to circulate through said apertures and in the immediate vicinity of said brake drum, and a disc-shaped cover plate detachably engaging said rim, said cover plate being apertured to permit passage of air therethrough.

5. A vehicle wheel assembly comprising a hub having an apertured radial flange, a brake drum secured to said flange, a rim secured to said flange, means for forcing air through the apertures in said flange and about said brake drum, said means comprising vanes formed on said flange, and a disc-shaped cover plate detachably engaging said rim, said cover plate being apertured to permit passage of air therethrough.

FRANK C. BEST.